(12) United States Patent
Cook et al.

(10) Patent No.: US 8,102,400 B1
(45) Date of Patent: Jan. 24, 2012

(54) METHOD AND APPARATUS FOR PROVIDING ENHANCED RESOLUTION DISPLAY FOR DISPLAY TELEPHONES AND PDAS

(75) Inventors: Colin N.B. Cook, Riverton, UT (US); Donald T. Saxby, Salt Lake City, UT (US); Randall C. Johnson, Pleasant Grove, UT (US)

(73) Assignee: Celio Corporation, Salt Lake City, UT (US)

( * ) Notice: Subject to any disclaimer, the term of this patent is extended or adjusted under 35 U.S.C. 154(b) by 965 days.

(21) Appl. No.: 12/042,942

(22) Filed: Mar. 5, 2008

Related U.S. Application Data

(60) Provisional application No. 60/908,118, filed on Mar. 26, 2007, provisional application No. 60/908,125, filed on Mar. 26, 2007, provisional application No. 60/908,134, filed on Mar. 26, 2007.

(51) Int. Cl.
*G09G 5/399* (2006.01)
*G09G 5/36* (2006.01)

(52) U.S. Cl. ......... 345/539; 345/545; 345/547; 345/548
(58) Field of Classification Search .................. 345/539, 345/545, 547, 548
See application file for complete search history.

(56) References Cited

U.S. PATENT DOCUMENTS 5,990,852 A * 11/1999 Szamrej .................. 345/2.1
7,173,635 B2 * 2/2007 Amann et al. ............... 345/660

* cited by examiner

*Primary Examiner* — Hau Nguyen
(74) *Attorney, Agent, or Firm* — Kilpatrick Townsend & Stockton LLP

(57) ABSTRACT

In a mobile device with a mobile device video driver that can be interdicted, such as a display telephone or PDA, a method and system for display on a remote video display device is provided involving forming an enhanced display image in an enhanced video frame buffer and reconstructing the display image in a duplicate enhanced video frame buffer in the remote video display device.

24 Claims, 4 Drawing Sheets

METHOD AND APPARATUS FOR PROVIDING ENHANCED RESOLUTION DISPLAY FOR DISPLAY TELEPHONES AND PDAS

CROSS-REFERENCES TO RELATED APPLICATIONS

See application data sheet

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE (OR SEE APPENDIX)

BACKGROUND OF THE INVENTION

This invention relates primarily to technology for enhancing the interface of an intelligent mobile telephone, a smart phone, a personal digital assistant (PDA) or like device having a display, a processor and a mobile operating system with a graphical interface. An example is the Microsoft Windows Mobile operating system used in cellular telephones and PDAs having a processing unit capable of supporting the operating system. Smart phones herein encompass hand-held small mobile computers with some telecommunication capability and that are functional as telephones and that have primary constraints on size, weight and portability. Such constraints, as a consequence, impose constraints on power, display resolution and data entry capabilities, as compared with portable laptop computers, desktop computers and the like. For the purposes of this invention, there is no distinction to be drawn between smart phones and handheld personal digital assistants, so hereinafter the terms may be used interchangeably.

Smart phones are becoming a primary personal data assistant, since they can provide a host of functions integrated into a single pocket-sized computer unit, including telephone, email, messaging, internet access, calendar, calculator, task managers, word processor, still and video camera, clock and alarm clock, as well as a an audio and video entertainment center, game console, GPS, and a host of other computer-based functions. A smart phone can even serve as a flashlight. However, the major strength of the smart phone—its extreme portability—is also a major weakness. Because of its inherent small size, the smart phone is not able to provide a display or a fully functional keyboard and pointing device useable for office applications such as word processing, spreadsheet programs, email clients, etc. These constraints limit the potential versatility of the smart phone.

A class of hardware and software products exist to address the so-called KVM (keyboard-video-mouse) interface problem. Unlike a conventional KVM application wherein a fixed asset is made accessible at a remote location, this invention relates to enhancing limited capabilities of a typical mobile asset in a local environment. Extended keyboards have been developed for selected personal digital assistants (PDAs). Software has been developed to extract data from smart phones for use on the mobile or desktop computers. Hot sync capability provides backup but does not necessarily provide a complete mirror of the content of mobile device. Screen copier programs copy phone display images to desktop computer screens, but do not enhance phone display resolution.

The challenge is to provide enhanced display output to a high resolution display device, such as a projector or a desktop display, over a limited bandwidth in a reasonable refresh rate. One known technique is the so-called screen scraping technique. According to this technique, an application is installed that gains access to the primary display driver display buffer and periodically copies its content to a network protocol for remote viewing. In another method, the default primary display driver is replaced with another display driver that typically has a higher resolution. These techniques are noticeably slow to execute, since they must copy post-rendered data via the operating system to an add-on application. Another disadvantage is that periodic sampling may result in missing content. This process is inefficient and can leave an unsatisfactory visual impression and noticeably slow display of images, particularly video images.

What is needed is a technique to provide an alternative video display for handheld smartphones or PDAs.

SUMMARY OF THE INVENTION

According to the invention, in a mobile device or, including those with wireless telephony subsystems as in a smart phone or a personal digital assistant (PDA), that has a mobile device operating system with a local video driver, a method and system for display on a remote video display device is provided involving forming an enhanced display image in an enhanced primary video frame buffer, and reconstructing the display image in a duplicate enhanced video frame buffer in the remote (external) video display device. Other features of the invention include techniques for compressing, storing, and updating the video images for efficiency and enhanced user experience, as well as digital data interchange of manual (e.g., keyboard) input.

The invention will be better understood by reference to the following detailed description in connection with the accompanying drawings.

DESCRIPTION OF SPECIFIC EMBODIMENTS OF THE INVENTION

Figure 1:
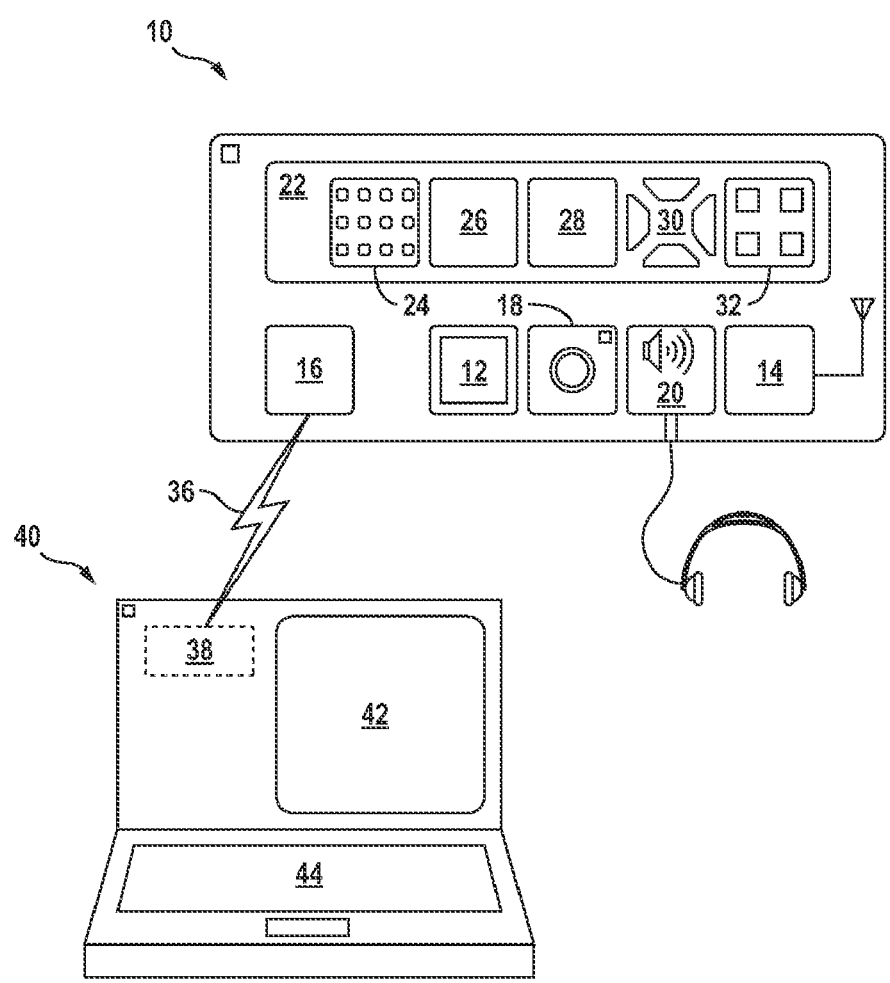
FIG. 1 is a pictorial block diagram showing a mobile device with a video display and optional telephony subsystem connected to a remote display device.

Reference is made to FIG. 1. A typical smart handheld mobile device 10 has a low resolution display 12, optional wireless telephony subsystem 14, a local peripheral communications port 16, other features 18, 20 supporting a camera or audio, and a rudimentary manual input subsystem 22, such as a small keyboard 24, a touchpad 26, a touch screen 28, a scrolling mechanism 30, dedicated function keys 32. The local peripheral communications port 16 is configured to connect and to convey commands and information, including graphics, to a remote display device 40, usually substantially larger in size but with fewer features according to the invention, over a relatively efficient communication channel 36. For the purpose of this invention, the remote display device 40 has a display subsystem 42 and a local peripheral communications interface 38 that is configured to communicate with the local peripheral communications port 16 on the mobile device via channel 36. The remote display device 40 may also be equipped with a keyboard and other associated manual input/output subsystems 44, but it need not be equipped with hardware and software of a fully capable computer. However, it is not outside the scope of the present invention to contemplate that a software program running on a fully capable computer may operate in the manner of a dedicated limited capability enhanced keyboard and display.

Figure 2:
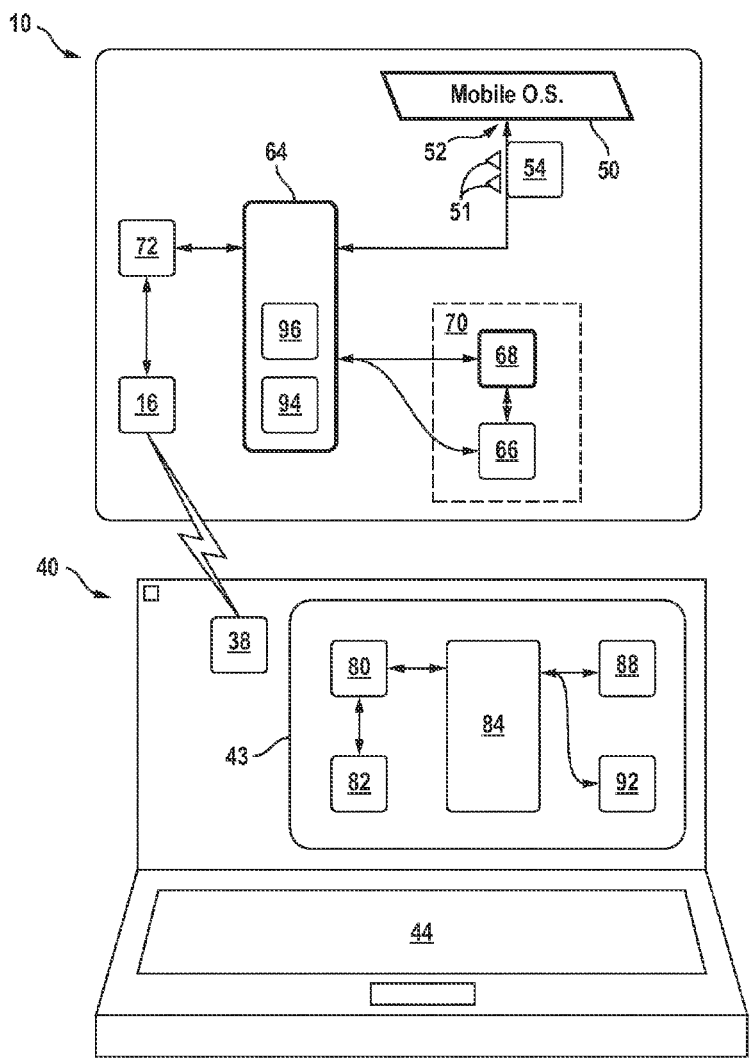
FIG. 2 is a pictorial block diagram showing functional components in accordance with one embodiment of the invention.

FIG. 2 is a more detailed pictorial block diagram of functional elements of the invention as distributed between the mobile device 10 and the remote display device 40. The mobile device 10 is equipped with a mobile operating system 50 that has a driver interface 52 where application program interface (API) messages 51 are exchanged. In a specific embodiment of a Microsoft Windows Mobile operating system, the exchange location 54 is the interface between the Graphics Device Interface (GDI) 52 and a conventional Microsoft video device driver (not shown).

According to the invention, an enhanced display driver 64 for processing and for ultimate display on the remote video display device 40, is provided in direct replacement of the conventional video device driver. According to the invention, the enhanced video driver 64 interprets the API messages 51 directly from the operating system 50 to create an enhanced display image, which interpretation may include analyzing, converting, compressing, coalescing, aggregating, adding or substituting equivalent but more efficient commands, and generally preparing elements for communicating a full description of the frame data of the enhanced display image that is stored in the enhanced primary video frame buffer 68 via a communication driver 72. The mobile device 10 has an enhanced primary video frame buffer 68 and one or more enhanced video off-screen buffers 66 or support memory that are resident in the local storage medium 70, such as registers, cache or ROM, that stores frames and commands related to the enhanced display image. The enhanced primary video frame buffer 68 contains images visible to the user, while the off-screen buffers 66 contain images not visible to the user. The off-screen buffers 66 are used for temporary storage and to compose images that may be copied to the primary buffer 68 making them visible to the user.

The mobile device 10 contains communication driver 72 that is operative for packaging the display information as prepared by the enhanced video driver 64 for communication to the remote display device 40 using the local peripheral communications interface 16. The mode of communication is not a specific element of the invention. However, it is to be understood that the mobile device 10 and the remote display device 40 share a compatible communication protocol. Suitable protocols include data and command communication in packet format, such as USB, IEEE 1394, Bluetooth, or the like, configured to a local and/or mobile environment.

The remote video display device 40 has, in addition to its own enhanced display subsystem 43 and its local peripheral communications interface 38, a processor 80 of limited capacity and internal memory 82, containing a remote device enhanced video driver 84 for receiving and reconstructing a copy of the enhanced display image in a duplicate enhanced primary video frame buffer 88 or duplicate enhanced video off-screen buffer or buffers 92. The remote device enhanced video driver 84 is configured to receive and interpret the commands and information received via its local peripheral communications interface 38 in order to reconstruct the copy of the enhanced display image.

In addition, the enhanced display driver 64 may include a mechanism 94 for creating a statistically unique identifier for images which are known to be stored in the remote display device's 40 duplicate enhanced video primary and off-screen buffers 88, 92. In connection with the mechanism for creating a statistically unique identifier 94, the enhanced video driver 64 may optionally contain a mechanism 96 for comparing image identifiers and substituting equivalent but more efficient commands for recreating images within the video display driver 84 on the remote display device 40. The image identifier creation mechanism 94 and comparison mechanism 96 may use a CRC checksum algorithm and the outputs are CRC values that can be compared with CRC values calculated for the enhanced video image at the enhanced video driver 64, which the comparison mechanism 96 may store in a local table of the mobile device for comparison with previously generated and stored images to determine whether the new image or a portion thereof needs to be processed and sent on to the display device 40. The form of communication may be merely commands to update the reconstructed enhanced image with any update information that may be provided.

The enhanced video display driver maintains synchronicity between the enhanced display primary buffer 68 on the mobile device and the duplicate enhanced display primary buffer 88 on the remote display device 40 such that their contents are maintained to be identical. As part of the invention, the communication of image data can be delayed until the reconstructed enhanced image is needed at remote video display device 40. More particularly, the enhanced display driver 64 may not maintain synchronicity between the enhanced display off-screen buffer(s) 66 on the mobile device and the duplicate enhanced display off-screen buffer(s) 92 on the remote display device to the point that when display images are moved from the off-screen buffer(s) 66 to the enhanced display primary buffer 68, at that time the enhanced display driver 64 may apply certain processing to the images such as, but not limited to, aggregation, elision, substitution, and compression thereby reducing the amount of data required to represent the image which data is then sent to the remote enhanced display driver 84.

Figure 3:
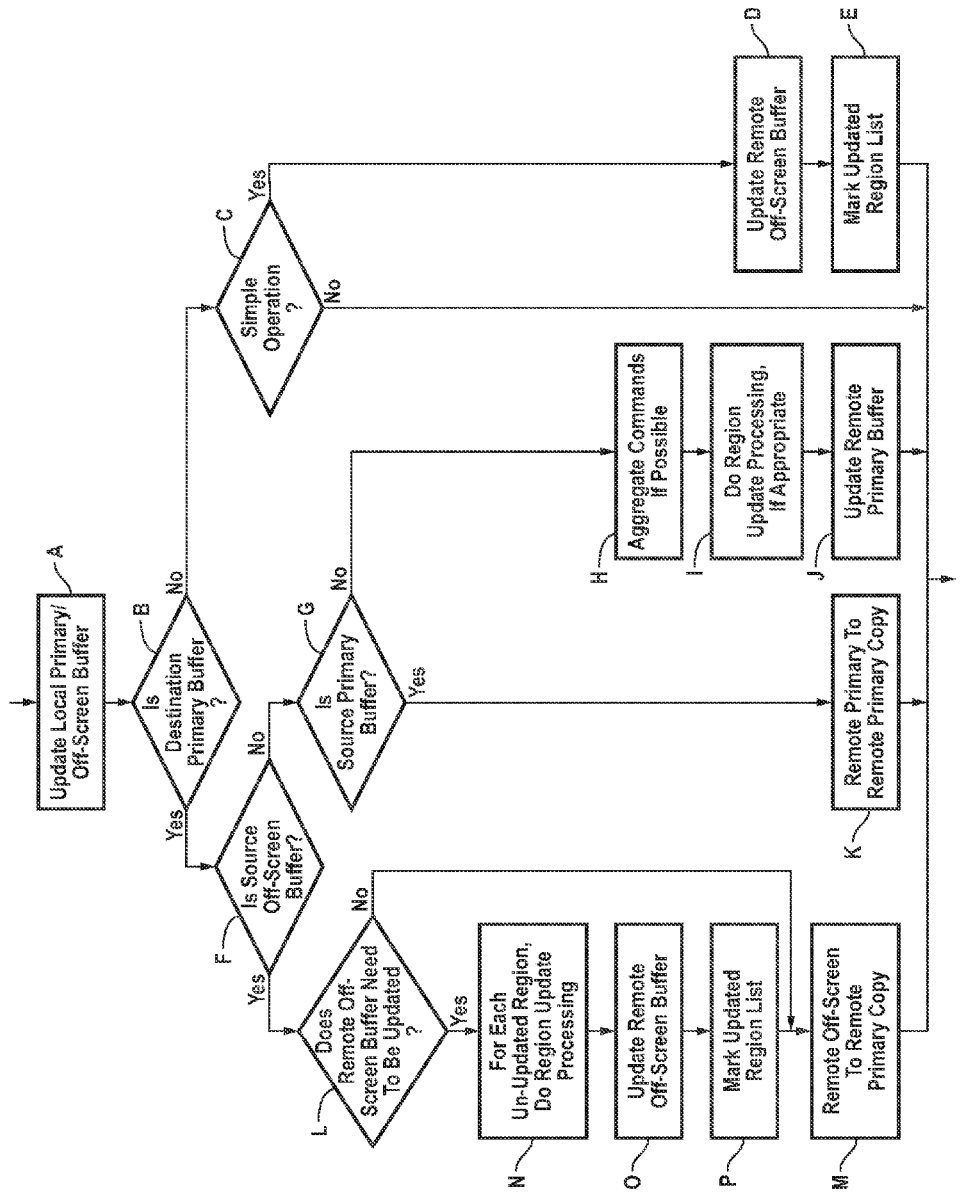
FIG. 3 is a flow chart of a process according to a specific embodiment of the invention.

FIG. 3 is a flow chart that outlines the integrated operation of the drivers of the mobile device 10 and the remote display device 40. Upon receipt of the trigger to update the screen buffer (e.g. the video frame buffer (Step A), the choice is whether the destination is the primary frame buffer 68 or the offscreen buffer 66 (Step B). If the destination choice is the offscreen buffer, the decision is whether it is a simple operation (Step C). If so, the operation is to update the remote offscreen buffer 92 (Step D) with the corresponding simple command and mark an updated region list (Step E). Non-simple operations await a next level of processing. If the destination is the primary buffer (Step B), then the decision is if the source of image data is in the off-screen buffer 66 (Step F). If it isn't, then the test is whether the source is in the primary buffer 68 (Step G). If it is not, then an attempt is made to aggregate commands (Step H), perform regional update processing as appropriate (Step I) and update the remote primary frame buffer 88 (Step J). However, if the source is in the primary frame buffer (Step G), then selected contents of the remote primary frame buffer 88 is copied into another area of the remote primary frame buffer 88 (Step K). If the source is in the off-screen buffer 60 (Step F), then the remote off-screen buffer 92 is checked to determine if it needs to be updated (Step L). If not, then a selected portion of the contents of the remote off-screen buffer 92 is copied into the remote primary buffer 88 (Step M). If the remote off-screen buffer 92 needs to be updated (Step L), then, for each un-updated region in a frame, the region processing is carried out (Step N), this being processing that was skipped (Step C) as not being simple processing. Thereafter, the remote off-screen buffer 92 is updated with the processed data (Step O), and the region list is marked to indicate which regions have been updated (Step P). Thereafter the processed portion of the remote off-screen data is copied to the remote primary buffer 88 (Step M).

Figure 4:
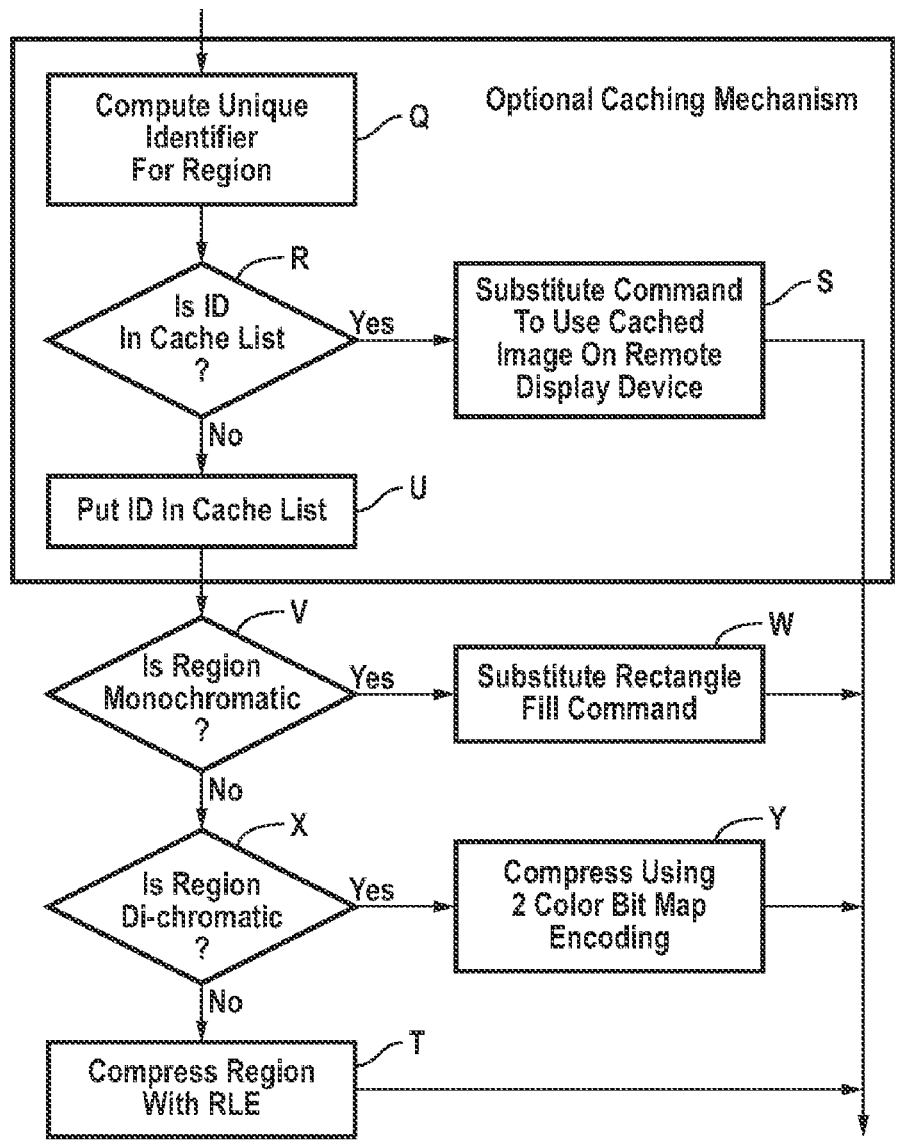
FIG. 4 is a flow chart of a process for updating regions of a frame buffer according to a specific embodiment of the invention.

Referring to FIG. 4, region update processing (Step I or N) is explained whereby regions of a display image can be selectively updated, thereby minimizing the amount of duplicate processing and communication. The optional caching procedure is carried out first wherein a unique region identifier is computed (Step Q) and then tested against a cached region ID list (Step R). If it is found, then the command to use cached image on the remote display device is substituted (Step S) for the default RLE compression command (Step T), and the new ID is placed in the cache list (Step U). Beyond this optional caching the region update processing proceeds, and the test is made whether the region of interest is monochromatic (Step V), in the event of which a rectangle fill command is substituted (Step W). If it is not monochromatic, the region is further tested to see if it is di-chromatic (Step X), in the event of which a compression process is used based only on a two-color bit map encoding (Step Y). All other conditions prompt the use of a data compression algorithm one of which is conventional run-length encoding (RLE)-type compression (Step T).

The invention has been explained with reference to specific embodiments. Other embodiments will be evident to those of ordinary skill in the art. It is therefore not intended that the invention be limited, except as indicated by the appended claims.

What is claimed is:

1. A method for enhancing video output of a mobile telephone or personal digital assistant device having a processing unit operative with a mobile device operating system with a graphics subsystem that is configured to interface with a mobile device video driver, for display on a remote video display device, wherein the remote video display device has video display presentation capabilities, the method comprising the steps of:
   providing to the mobile telephone or personal digital assistant an enhanced video driver in connection with an enhanced primary video frame buffer on the mobile telephone or personal digital assistant without modification to the mobile device operating system for temporary storage of a representation of a complete enhanced display image;
   accessing and interpreting application program interface (API) messages from said graphics subsystem without modification to the graphics subsystem;
   allocating support memory in support of said primary frame buffer, said enhanced video driver being responsive to said video API messages without access to said underlying mobile operating system to construct the enhanced display image in said enhanced primary video frame buffer using said support memory; and
   communicating only a fraction of said representation of said enhanced display image from either the enhanced primary video frame buffer or the support memory to the remote video display device, said fraction representing a region of said completed enhanced display image stored in said support memory, said remote video display device having a duplicate enhanced primary video frame buffer for holding a complete reconstructed enhanced display image for display on said remote video display device.

2. The method according to claim 1 wherein said communicating step includes employing said support memory to identify changed image components and to update content of said duplicate enhanced primary frame buffer with said changed image components in order to minimize data transfer.

3. The method according to claim 1 further including caching selected elements of said enhanced display image in said remote video display device for subsequent use.

4. The method according to claim 3 wherein said caching step includes storing said elements in remote off-screen buffers.

5. The method according to claim 1 wherein said support memory comprises local off-screen buffers, and wherein said accessing and interpreting step includes directing, to said local off-screen buffers, in response to said video API messages, portions of images as image elements for use to construct the enhanced display image.

6. The method according to claim 3 further comprising comparing first unique image identifier values for subsequently formulated image elements with second unique identifier values for said cached image elements, said first and second unique identifier values being stored in said mobile device, for updating said remote enhanced display image.

7. The method according to claim 6 wherein said first and second unique identifier values are CRC values.

8. The method according to claim 3 wherein cached image elements are available on said remote video display device, further including sending updating messages from said enhanced video driver to said duplicate enhanced primary frame buffer to reuse said image elements in said reconstructed enhanced display image.

9. The method according to claim 1 wherein said communicating step includes sending messages directly corresponding to selected ones of said video API messages.

10. The method according to claim 1 wherein said communicating step is delayed until said reconstructed enhanced image is needed for display in the remote video display device.

11. The method according to claim 1 wherein said communicating step further includes determining color type of said enhanced display image representation, selecting a compression method according to said color type, and providing as said representation a corresponding compressed image element.

12. A system for enhancing video output of a mobile telephone or personal digital assistant device having a processing unit operative with a mobile device operating system with a graphics subsystem that is configured to interface with a mobile telephone video driver, for display on a remote video display device, wherein the remote video display device has video display presentation capabilities, the system comprising:
   an enhanced primary frame buffer installed on the mobile telephone or personal digital assistant without modification to the mobile device operating system for temporary storage of a representation of holding complete enhanced display image;
   an enhanced video driver configured to be co-resident with said mobile device operating system without modification to the mobile device operating system, said enhanced video driver having access to support memory and said enhanced primary frame buffer of said mobile device;

a display driver interface manager configured to be co-resident with said mobile operating system and responsive to video API messages without access to said underlying mobile operating system to modify display values, including code for capturing, into said display driver interface manager, application program interface messages from said graphics subsystem that are directed to said mobile telephone video driver (said video API messages), code for directing values of said video API messages from said display driver interface manager to said enhanced video driver, and code for forming in said enhanced primary frame buffer an enhanced display image according to said video API messages; and code for communicating a representation of said enhanced display image to the remote video display device using at least a portion of said support memory, said remote video display device having a duplicate enhanced primary frame buffer for holding a complete reconstructed enhanced display image for display on said remote video display device.

13. The system according to claim 12 further including code for accessing said support memory to identify changed image components and to update content of said duplicate enhanced primary frame buffer with only said changed image components in order to minimize data transfer.

14. The system according to claim 12 further including code for caching selected elements of said enhanced display image in said remote video display device for subsequent use.

15. The system according to claim 14 wherein said caching code is configured to store said elements in remote off-screen buffers.

16. The system according to claim 12 wherein said support memory comprises local off-screen buffers, and wherein said display driver interface manager includes code for directing, to said local off-screen buffers, in response to said video API messages, portions of images as image elements for use to construct the enhanced display image.

17. The system according to claim 16 further including code for comparing first unique image identifier values for subsequently formulated image elements with second unique identifier values for said cached image elements, said first and second unique identifier values being stored in said mobile device, for updating said remote enhanced display image.

18. The system according to claim 17 wherein said first and second unique identifier values are CRC values.

19. The system according to claim 14 wherein cached image elements are available on said remote video display device, further including code for sending updating messages from said enhanced video driver to said duplicate enhanced primary frame buffer to reuse said image elements in said reconstructed enhanced display image.

20. The system according to claim 12 wherein said communicating code includes code for sending messages directly corresponding to selected ones of said video API messages.

21. The system according to claim 12 wherein said communicating code includes code for delaying until said reconstructed enhanced image is needed for display in the remote video display device.

22. The system according to claim 12 wherein said communicating code further includes code for determining color type of said enhanced display image representation, selecting a compression method according to said color type, and providing as said representation a corresponding compressed image element.

23. In a display telephone or a personal digital assistant mobile device having an operating system unable to reinitialize a display driver and having a driver interface that can be interdicted, a method for display on a remote video display device comprising:

capturing in the mobile device video API messages into a display driver interface manager (DDI manager) without accessing the operating system except through the API messages;

directing values of the API messages from the DDI manager to either an enhanced video driver or to a mobile device video driver without reinitializing;

forming an enhanced display image in an enhanced video frame buffer in the mobile device;

packaging the enhanced display image for communication to a remote video display device;

communicating the enhanced display image to the remote device; and reconstructing the packaged display image in a duplicate enhanced video frame buffer in the remote video display device.

24. A system for enhancing display of a display telephone or a personal digital assistant host device having a limited capability operating system with a driver interface that can be interdicted, for display on a remote video display device comprising:

an enhanced video frame buffer added to the host device for holding an enhanced video image;

an enhanced video driver co-resident with said operating system and configured to interpret video API messages and to construct the enhanced display image in the enhanced video frame buffer without accessing said underlying mobile operating system except through the API messages;

a display driver interface manager co-resident with said operating system for capturing video API messages without accessing the limited capability operating system except through the API messages and for selectively redirecting values of the API messages to said enhanced video driver; and a duplicate enhanced video buffer resident in said remote video display device for holding a reconstructed enhanced display image from said display driver interface manager for display in said remote video display device.

* * * * *